US008921255B2

(12) United States Patent
Ohtake et al.

(10) Patent No.: US 8,921,255 B2
(45) Date of Patent: Dec. 30, 2014

(54) COMPLEX OXIDE, METHOD FOR PRODUCING SAME AND EXHAUST GAS PURIFYING CATALYST

(75) Inventors: Naotaka Ohtake, Anan (JP); Kazuhiko Yokota, Shanghai (CN)

(73) Assignee: Anan Kasei Co., Ltd., Tokushima (JP)

( * ) Notice: Subject to any disclaimer, the term of this patent is extended or adjusted under 35 U.S.C. 154(b) by 204 days.

(21) Appl. No.: 13/511,846

(22) PCT Filed: Nov. 25, 2010

(86) PCT No.: PCT/JP2010/071005
§ 371 (c)(1),
(2), (4) Date: Aug. 6, 2012

(87) PCT Pub. No.: WO2011/065416
PCT Pub. Date: Jun. 3, 2011

(65) Prior Publication Data
US 2012/0316059 A1 Dec. 13, 2012

(30) Foreign Application Priority Data
Nov. 25, 2009 (JP) ................... 2009-267893

(51) Int. Cl.
B01J 21/00 (2006.01)
B01J 23/00 (2006.01)
(Continued)

(52) U.S. Cl.
CPC .............. B01J 23/10 (2013.01); B01J 35/1014 (2013.01); B01J 37/0201 (2013.01);
(Continued)

(58) Field of Classification Search
CPC .......... B01J 23/002; B01J 23/10; B01J 20/06; B01J 20/08; B01J 20/03; B01J 35/1014; C01F 17/0043; C01B 33/113; C01B 33/20; C01P 2006/12; C01P 2006/13; C01P 2006/90

USPC ................ 423/326, 593.1; 502/263, 304
See application file for complete search history.

(56) References Cited

U.S. PATENT DOCUMENTS 4,624,940 A 11/1986 Wan et al.
4,760,044 A * 7/1988 Joy et al. ................. 502/303
(Continued)

FOREIGN PATENT DOCUMENTS

JP 62-56322 A 3/1987
JP 5-270824 A 10/1993
(Continued)

OTHER PUBLICATIONS

Reddy et al., "Surface Characterization of CeO2/SiO2 and V2O5/CeO2/SiO2 Catalysts by Raman, XPS, and other Techniques," J. Phys. Chem. B 2002, 106, 10964-10972.*
(Continued)

Primary Examiner — Anthony J Zimmer
(74) Attorney, Agent, or Firm — Sughrue Mion, PLLC

(57) ABSTRACT

Disclosed are a silicon-containing cerium composite oxide which is capable of maintaining a large specific surface area even used in a high temperature environment, and which has excellent heat resistance and reducibility, as well as a method for producing the composite oxide and a catalyst for exhaust gas purification employing the composite oxide. The composite oxide contains 2 to 20 mass % silicon in terms of $SiO_2$, has properties of exhibiting a specific surface area of not less than 40 $m^2/g$ as measured by the BET method after calcination at 1000° C. for 5 hours, and a reducibility of not lower than 30% as calculated from measurement of temperature-programmed reduction from 50° C. to 900° C. after calcination at 1000° C. for 5 hours, and is suitable for a co-catalyst for a catalyst for exhaust gas purification.

10 Claims, 1 Drawing Sheet

(51) Int. Cl.
*B01J 23/10* (2006.01)
*C01B 33/20* (2006.01)
*C01B 13/00* (2006.01)
*C01C 1/00* (2006.01)
*C01D 1/02* (2006.01)
*B01J 35/10* (2006.01)
*B01J 37/02* (2006.01)
*B01J 37/08* (2006.01)
*H01M 8/12* (2006.01)
*B01D 53/94* (2006.01)
*F02D 41/02* (2006.01)

(52) U.S. Cl.
CPC .............. *B01J 37/08* (2013.01); *H01M 8/1246* (2013.01); *H01M 8/126* (2013.01); *B01D 53/945* (2013.01); *B01D 2255/2065* (2013.01); *B01D 2255/30* (2013.01); *B01D 2255/40* (2013.01); *B01D 2255/908* (2013.01); *B01D 2255/9207* (2013.01); *F02D 41/0295* (2013.01); *F01N 2570/16* (2013.01); *Y02T 10/22* (2013.01); *Y02E 60/521* (2013.01); *Y02E 60/525* (2013.01)
USPC ......... 502/263; 502/304; 423/326; 423/593.1

(56) References Cited

U.S. PATENT DOCUMENTS

| | | | |
|---|---|---|---|
| 4,940,685 A | 7/1990 | Sauvion et al. | |
| 5,529,969 A | 6/1996 | Bonneau et al. | |
| 6,150,288 A * | 11/2000 | Suzuki et al. | 501/105 |
| 6,306,794 B1 * | 10/2001 | Suzuki et al. | 502/304 |
| 7,214,643 B2 * | 5/2007 | Yamamoto et al. | 502/300 |
| 7,220,702 B2 * | 5/2007 | Hara et al. | 502/327 |
| 7,604,789 B2 * | 10/2009 | Takeshima et al. | 423/263 |
| 7,968,490 B2 * | 6/2011 | Takeshima et al. | 502/302 |
| 8,206,671 B2 * | 6/2012 | Takeshima et al. | 423/263 |
| 8,435,918 B2 * | 5/2013 | Eyring et al. | 502/304 |
| 8,475,755 B2 * | 7/2013 | Dang et al. | 423/240 S |
| 2001/0051122 A1 | 12/2001 | Hori et al. | |
| 2003/0036477 A1* | 2/2003 | Nordquist et al. | 502/527.19 |
| 2003/0224931 A1* | 12/2003 | Yamamoto et al. | 502/304 |
| 2005/0175525 A1 | 8/2005 | Fu et al. | |
| 2007/0249494 A1* | 10/2007 | Eyring et al. | 502/237 |
| 2009/0220398 A1 | 9/2009 | Verdier et al. | |
| 2010/0111789 A1 | 5/2010 | Fajardie et al. | |
| 2011/0044874 A1* | 2/2011 | Dang et al. | 423/240 S |

FOREIGN PATENT DOCUMENTS

| | | |
|---|---|---|
| JP | 10-230162 A | 9/1998 |
| JP | 11-216676 A | 8/1999 |
| JP | 2007-520364 A | 7/2007 |
| JP | 2009-530091 A | 8/2009 |
| WO | 2008/025753 A2 | 3/2008 |

OTHER PUBLICATIONS

Rocchini et al., "Relationships Between Structural/Morphological Modifications and Oxygen Storage—Redox Behavior of Silica-Doped Ceria," Journal of Catalysis, 2000, vol. 194, pp. 461-478.

Reddy et al., "Nanosized $CeO_2$—$SiO_2$, $CeO_2$—$TiO_2$, and $CeO_2$—$ZrO_2$ Mixed Oxides: Influence of Supporting Oxide on Thermal Stability and Oxygen Storage Properties of Ceria," Catalysis Surveys from Asia, 2005, vol. 9, No. 3, pp. 155-171.

European Patent Office, European Search Report issued in corresponding EP Application No. 10833262.8, dated Aug. 5, 2013.

International Search Report for PCT/JP2010/071005 dated Feb. 8, 2011.

Eliana Rocchini et al., "Relationships between Structural/Morphiological Modifications and Oxygen Storage-Redox Behavior of Silica-Doped Ceria", Journal of Catalysts, 2000, pp. 461-478, vol. 194.

* cited by examiner

COMPLEX OXIDE, METHOD FOR PRODUCING SAME AND EXHAUST GAS PURIFYING CATALYST

CROSS REFERENCE TO RELATED APPLICATIONS

This application is a National Stage of International Application No. PCT/JP2010/071005 filed Nov. 25, 2010, claiming priority based on Japanese Patent Application No. 2009-267893 filed Nov. 25, 2009, the contents of all of which are incorporated herein by reference in their entirety.

FIELD OF ART

The present invention relates to a composite oxide which may be used as a catalyst, functional ceramics, solid electrolyte for fuel cells, abrasive, and the like, particularly suitably used as a co-catalyst material in catalysts for purifying vehicle exhaust gas and the like, and which has excellent heat resistance and a cerium oxide reducibility, as well as to a method for producing the composite oxide and a catalyst for exhaust gas purification employing the composite oxide.

BACKGROUND ART

Catalysts for purifying vehicle exhaust gas and the like are composed of a catalytic metal such as platinum, palladium, or rhodium, and a co-catalyst for enhancing the catalyst action of such metal, both supported on a catalyst support made of, for example, alumina or cordierite. The co-catalyst material absorbs oxygen under the oxidizing atmosphere and desorbs oxygen under the reducing atmosphere, and functions to optimally maintain the fuel/air ratio for efficient purification of noxious components in exhaust gases, such as hydrocarbons, carbon monoxide, and nitrogen oxides.

Efficiency of a catalyst for purifying exhaust gas is generally proportional to the contact area between the active species of the catalytic metal and exhaust gas. It is also important to maintain the fuel/air ratio at optimum, for which the reducibility associated with oxygen absorbing and desorbing capability of the co-catalyst should be maintained at a high level. However, a co-catalyst, such as cerium-containing oxides, is apt to be sintered during use at high temperatures, e.g., for exhaust gas purification. This results in reduction of its specific surface area, causing aggregation of the catalytic metals and decrease in the contact area between exhaust gas and the catalytic metals, which leads to reduction of efficiency in purifying exhaust gases.

In the light of the above, for improving the heat resistance of cerium oxide, Patent Publication 1 discloses methods of producing a ceric composite oxide containing silicon or the like elements, wherein ceric oxide is intimately mixed with an oxide of a metallic element such as silicon and calcinated; wherein ceric oxide is impregnated with an aqueous solution of a metal salt, such as silicate, which may be converted to an oxide by heating, and calcined; or wherein a precursor of a metal oxide, such as silicon oxide, is introduced into an aqueous colloidal dispersion of a cerium (IV) compound, a basic material is added to the dispersion to obtain a precipitate, the precipitate thus formed is subjected to solid-liquid separation and heat-treated. This publication also discloses that the amount of the oxide of a metallic element such as silicon is 1 to 20 mass %, preferably 1 to 5 mass % of the ceric oxide.

However, the ceric oxides containing 2.5 mass % $SiO_2$ specifically produced in Examples 1, 5, and 6 of Patent Publication 1 exhibit specific surface areas of 20 $m^2/g$ at most as measured by the BET method after calcination at 900° C. for 6 hours. Further improvement is demanded.

For further improvement of the heat resistance of a cerium composite oxide containing silicon or the like as disclosed in Patent Publication 1, Patent Publication 2 discloses a process for the preparation of a composite oxide including the steps of suspending a ceric hydroxide having the formula Ce $(M)_x$ $(OH)_y(NO_3)_z$, in which M is an alkali metal or a quaternary ammonium radical, x ranges from 0.01 to 0.2, y is such that y=4−z+x, and z ranges from 0.4 to 0.7, in an aqueous solution containing a decomposable base, such as ammonia, and a silicon compound, thermally treating the resulting suspension in a sealed container at less than the critical temperature and under less than the critical pressure thereof to form a medium of reaction, cooling the medium of reaction and releasing the medium of reaction to atmospheric pressure, separating ceric hydroxide therefrom, and calcining the ceric oxide thus separated, to thereby give a composite oxide wherein a silicon values is present in an amount of less than 2% by mass of the cerium values, expressed as $SiO_2$.

In the Examples of Patent Publication 2, as shown in Table 1, a composite oxide having excellent heat resistance is disclosed, of which $SiO_2$ value is in an amount of 0.94% by weight of the ceric oxide value, and which exhibits a specific surface area of 52 $m^2/g$ as measured by the BET method after calcination at 1000° C. for 6 hours.

However, Patent Publication 2 is silent about the reducibility of the obtained composite oxide, and the composite oxide obtained by the production method taught in this publication cannot achieve a sufficient reducibility.

PRIOR ART PUBLICATIONS

Patent Publications

Patent Publication 1: JP-62-56322-A
Patent Publication 2: JP-5-270824-A

SUMMARY OF THE INVENTION

It is an object of the present invention to provide a silicon-containing cerium composite oxide which is capable of maintaining a large specific surface area even in use in a high temperature environment, which has excellent heat resistance and excellent reducibility, and which is particularly suitable for a co-catalyst for a catalyst for exhaust gas purification, as well as a catalyst for exhaust gas purification utilizing the composite oxide.

It is another object of the present invention to provide a method for producing a silicon-containing cerium composite oxide which realizes easy production of the composite oxide of the present invention with excellent heat resistance and reducibility.

According to the present invention, there is provided a silicon-containing cerium composite oxide comprising 2 to 20 mass % silicon in terms of $SiO_2$, and having properties of exhibiting a specific surface area of not less than 40 $m^2/g$ as measured by BET method after calcination at 1000° C. for 5 hours, and a reducibility of not lower than 30% as calculated from measurement of temperature-programmed reduction from 50° C. to 900° C. after calcination at 1000° C. for 5 hours (sometimes referred to as a present composite oxide hereinbelow).

According to the present invention, there is also provided a method for producing a silicon-containing cerium composite oxide comprising the steps of:

(a) providing a cerium solution not less than 90 mol % of which cerium ions are tetravalent, (b) heating and maintaining said cerium solution obtained from step (a) up to and at not lower than 60° C., (c) adding a precipitant to a cerium suspension obtained through said heating and maintaining to obtain a precipitate, (d) calcining said precipitate to obtain a cerium oxide, (e) impregnating said cerium oxide thus obtained through calcination with a solution of a silicon oxide precursor, and (f) calcining said cerium oxide thus impregnated with said solution of a silicon oxide precursor (sometimes referred to as the first method hereinbelow).

According to the present invention, there is further provided a method for producing a silicon-containing cerium composite oxide comprising the steps of:

(A) providing a cerium solution not less than 90 mol % of which cerium ions are tetravalent, (B) heating and maintaining said cerium solution obtained from step (A) up to and at not lower than 60° C., (C) adding a silicon oxide precursor to a cerium suspension obtained through said heating and maintaining, (D) heating and maintaining said cerium suspension containing said silicon oxide precursor up to and at not lower than 100° C., (E) adding a precipitant to the cerium suspension containing the silicon oxide precursor obtained through said heating and maintaining to obtain a precipitate, and (F) calcining the precipitate thus obtained (sometimes referred to as the second method hereinbelow).

According to the present invention, there is also provided a catalyst for exhaust gas purification comprising the composite oxide of the present invention.

The composite oxide according to the present invention contains a particular amount of silicon, is capable of maintaining excellent heat resistance, and has excellent reducibility, so that it is useful as a co-catalyst for a catalyst for exhaust gas purification.

The method for producing a silicon-containing cerium composite oxide according to the present invention includes the steps (a) to (f) or steps (A) to (F), so that the silicon-containing cerium composite oxide of the present invention may readily be obtained.

PREFERRED EMBODIMENTS OF THE INVENTION

Figure 1:
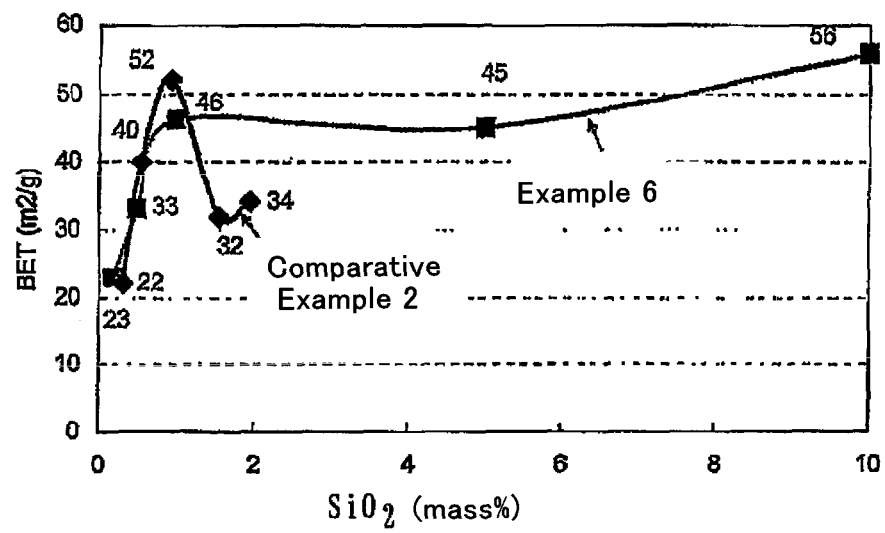
FIG. 1 is a graph showing the specific surface areas of the silicon-containing cerium composite oxides prepared in Example 6 and Comparative Example 2 measured by the BET method after calcination at 1000° C. for 5 hours.

The present invention will now be explained in detail.

The composite oxide according to the present invention has properties of exhibiting a specific surface area of not less than 40 m$^2$/g, preferably not less than 45 m$^2$/g, more preferably not less than 50 m$^2$/g, as measured by the BET method after calcination at 1000° C. for 5 hours, and a reducibility of not less than 30%, preferably not less than 35%, more preferably not less than 40%, as calculated from measurement of temperature-programmed reduction from 50° C. to 900° C. after calcination at 1000° C. for 5 hours. The maximum specific surface area is not particularly limited and may be about 60 m$^2$/g, and the maximum reducibility is not particularly limited and may be about 70%. Preferably, the composite oxide of the present invention has a specific surface area of not less than 60 m$^2$/g as measured by the BET method after calcination at 900° C. for 5 hours. With a specific surface area of less than 40 m$^2$/g as measured by the BET method after calcination at 1000° C. for 5 hours and a reducibility of less than 30% as calculated from measurement of temperature-programmed reduction from 50 to 900° C. after calcination at 1000° C. for 5 hours, the composite oxide cannot achieve both sufficient heat resistance and excellent reducibility at the same time, and may not exhibit excellent catalytic function when contained in a catalyst for exhaust gas purification.

As used herein, the specific surface area is a value determined by the BET method using nitrogen gas adsorption, which is a most popular method for determining specific surface areas of powders. The reducibility is a percent of trivalent cerium in the oxide reduced from tetravalent cerium as calculated from measurement of temperature-programmed reduction (TPR) from 50° C. to 900° C.

TPR is measured with an automatic temperature-programmed reduction analyzer (model TP-5000, manufactured by KABUSHIKI KAISHA OKURA RIKEN), under the following conditions; carrier gas: 90% argon-10% hydrogen; gas flow rate: 30 mL/min.; rate of raising temperature of sample during measurement: 10° C./min.; sample weight: 0.5 g.

The calculation was made according to the following formula:

Reducibility (%)=Hydrogen consumption of the sample actually measured (μmol/g)/Theoretical hydrogen consumption of cerium oxide in the sample (μmol/g)×100

The composite oxide according to the present invention has the above-mentioned properties, and contains 2 to 20 mass %, preferably 4 to 20 mass %, more preferably 5 to 20 mass %, most preferably 5 to 15 mass % silicon in terms of SiO$_2$ with respect to the total amount of silicon in terms of SiO$_2$ and cerium in terms of CeO$_2$. At a silicon content of less than 2 mass %, sufficient reducibility is not achieved, whereas at over 20 mass %, the specific surface area may be low.

The production methods according to the present invention realize easy production of silicon-containing cerium composite oxides, such as the present composite oxide, with good reproducibility, and the first of the methods includes step (a) of providing a cerium solution not less than 90 mol % of which cerium ions are tetravalent.

A water-soluble cerium compound which may be used in step (a) may be, for example, a ceric nitrate solution or ammonium ceric nitrate, with the ceric nitrate solution being particularly preferred.

In step (a), the initial concentration of the cerium solution not less than 90 mol % of which cerium ions are tetravalent, may be adjusted to usually 5 to 100 g/L cerium, preferably 5 to 80 g/L, more preferably 10 to 70 g/L in terms of CeO$_2$. Usually water is used for the adjustment of the concentration of the cerium solution, and deionized water is particularly preferred. If the initial concentration is too high, the crystallinity of the precipitate to be discussed later is not sufficiently high and sufficient pores for impregnation with the solution of silicon oxide precursor to be discussed later cannot be formed, resulting in insufficient heat resistance and reducibility of the ultimate composite oxide. Too low an initial concentration leads to low productivity, which is not industrially advantageous.

In the first method, step (b) of heating and maintaining the cerium solution obtained from step (a) up to and at not lower than 60° C. is carried out to cause reaction of the cerium solution. A reactor to be used in step (b) may either be a sealed- or open-type vessel. An autoclave reactor may preferably be used.

In step (b), the temperature at which the cerium solution is heated and maintained is not lower than 60° C., preferably 60 to 200° C., more preferably 80 to 180° C., most preferably 90 to 160° C. The duration of heating and maintaining is usually 10 minutes to 48 hours, preferably 30 minutes to 36 hours, more preferably 1 hour to 24 hours. With insufficient heating and maintaining, the crystallinity of the precipitate to be discussed later is not sufficiently high and a sufficient volume of pores for impregnation with the solution of silicon oxide precursor to be discussed later cannot be formed, resulting in insufficient heat resistance and reducibility of the ultimate composite oxide. Too long a period of heating and maintaining affects little the heat resistance and the reducibility and is not industrially advantageous.

The first method further includes step (c) of adding a precipitant to the cerium suspension obtained through the heating and maintaining in step (b) to obtain a precipitate.

The precipitant used in step (c) may be a base, for example, sodium hydroxide, potassium hydroxide, aqueous ammonia, ammonia gas, or a mixture thereof, with the aqueous ammonia being particularly preferred.

The precipitant may be added, for example, by preparing an aqueous solution of the precipitant at a suitable concentration and adding the solution to the cerium suspension obtained from step (b) under stirring, or in the case of ammonia gas, by bubbling the cerium suspension with the ammonia gas in the reactor under stirring. The amount of the precipitant to be added may easily be determined by monitoring the pH change of the suspension. Usually, the amount for generating a precipitate in the cerium suspension at pH 7 to 9, preferably pH 7 to 8.5, is sufficient.

Step (c) may be carried out after the cerium suspension obtained through the heating and maintaining in step (b) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably a room temperature of 20 to 30° C.

Through the precipitation reaction in step (c), a slurry containing a precipitate of cerium oxide hydrate with grown crystals is obtained. The precipitate may be separated by, for example, the Nutsche method, centrifugation, or filter-pressing. The precipitate may optionally be washed with water as needed. Further, in order to improve the efficiency in the following step (d), the precipitate may optionally be dried to a suitable level.

The first method includes step (d) of calcining the precipitate to obtain a cerium oxide. The temperature for the calcining is usually 250 to 500° C., preferably 280 to 450° C.

The cerium oxide obtained through calcination in step (d) is in the form of a porous body having pores of sufficient volume for impregnation with a solution of a silicon oxide precursor to be discussed later. This facilitates impregnation with a solution of a silicon oxide precursor and improves the heat resistance and the reducibility of the ultimate composite oxide.

The duration of the calcination may usually be 30 minutes to 36 hours, preferably 1 hour to 24 hours, more preferably 3 hours to 20 hours.

The first method includes step (e) of impregnating the cerium oxide obtained through calcination with a solution of a silicon oxide precursor.

The silicon oxide precursor used in step (e) may be any compound which may be converted to a silicon oxide through an oxidation treatment, such as calcining, as long as the calcined cerium oxide porous body may be impregnated with the compound dissolved in a solvent. Examples of the precursor may include silicates, such as sodium silicate, silane compounds, such as tetraethyl orthosilicate, silyl compounds, such as trimethylsilyl isocyanate, and quaternary ammonium silicates, such as tetramethyl ammonium silicate.

The solvent to be used for dissolving the silicon oxide precursor may be selected depending on the kind of the precursor to be used, and may be, for example, water or organic solvents, such as alcohol, xylene, hexane, or toluene.

The concentration of the solution of the silicon oxide precursor is not particularly limited as long as the cerium oxide may be impregnated with the solution, and may usually be 1 to 300 g/L, preferably about 10 to 200 g/L of the silicon oxide precursor in terms of $SiO_2$ for workability and efficiency.

In step (e), the amount of the silicon oxide precursor is usually 0.5 to 20 mass %, preferably 1 to 20 mass % of silicon oxide precursor in terms of $SiO_2$ with respect to the total amount of the silicon oxide precursor in terms of $SiO_2$ and the cerium in terms of $CeO_2$. For obtaining the composite oxide according to the present invention, the amount is usually 2 to 20 mass %, preferably 4 to 20 mass %, more preferably 5 to 20 mass %, most preferably 5 to 15 mass %. With too small an amount of silicon, the reducibility of the resulting composite oxide is low, whereas with too large an amount of silicon, the heat resistance of the resulting composite oxide is low and the specific surface area at higher temperatures is decreased.

In step (e), the impregnation of the cerium oxide with the solution of the silicon oxide precursor may be carried out, for example, by pore-filling, adsorption, or evaporation to dryness.

The pore-filling may be effected by measuring in advance the total pore volume of the cerium oxide, and adding the same volume of the solution of the silicon oxide precursor so that the surface of the cerium oxide is evenly wetted.

The first method includes step (f) of calcinating the cerium oxide thus impregnated with the solution of the silicon oxide precursor. The temperature of the calcination is usually 300 to 700° C., preferably 350 to 600° C.

The duration of calcination in step (f) may suitably be determined in view of the calcination temperature, and may usually be 1 to 10 hours.

In the first method, after step (e) and before step (f), the cerium oxide impregnated with the solution of the silicon oxide precursor may optionally be dried at about 60 to 200° C. With such a drying step, the efficiency of the calcination in step (f) may be improved.

The second method according to the present invention includes step (A) of providing a cerium solution not less than 90 mol % of which cerium ions are tetravalent.

A water-soluble cerium compound which may be used in step (A) may be, for example, a ceric nitrate solution or ammonium ceric nitrate, with the ceric nitrate solution being particularly preferred.

In step (A), the initial concentration of the cerium solution not less than 90 mol % of which cerium ions are tetravalent, may be adjusted to usually 5 to 100 g/L cerium, preferably 5 to 80 g/L, more preferably 10 to 70 g/L in terms of $CeO_2$. Usually water is used for the adjustment of the concentration of the cerium solution, and deionized water is particularly preferred. If the initial concentration is too high, the crystallinity of the precipitate to be discussed later is not sufficiently high and a sufficient volume of pores cannot be formed, resulting in insufficient heat resistance and reducibility of the ultimate composite oxide. Too low an initial concentration leads to low productivity, which is not industrially advantageous.

In the second method, step (B) of heating and maintaining the cerium solution obtained from step (A) up to and at not lower than 60° C. is carried out next.

A reactor to be used in step (B) may either be a sealed- or open-type vessel, and an autoclave reactor may preferably be used.

In step (B), the temperature at which the cerium solution is heated and maintained is not lower than 60° C., preferably 60 to 200° C., more preferably 80 to 180° C., most preferably 90 to 160° C. The duration of heating and maintaining is usually 10 minutes to 48 hours, preferably 30 minutes to 36 hours, more preferably 1 hour to 24 hours. With insufficient heating and maintaining, the crystallinity of the precipitate to be discussed later is not sufficiently high and a sufficient volume of pores cannot be formed, resulting in insufficient heat resistance and reducibility of the ultimate composite oxide. Too long a period of heating and maintaining affects little the heat resistance and the reducibility and is not industrially advantageous.

The second method further includes step (C) of adding a silicon oxide precursor to a cerium suspension obtained from step (B).

In step (C), the silicon oxide precursor to be added to the cerium suspension may be any compound which may be converted to a silicon oxide through an oxidation treatment, such as calcination, and may be, for example, colloidal silica, siliconate, or quaternary ammonium silicate sol, with the colloidal silica being particularly preferred in view of the production cost and reduction of environmental burden.

In step (C), the amount of the silicon oxide precursor is usually 0.5 to 20 mass % of the silicon oxide precursor, preferably 1 to 20 mass %, in terms of $SiO_2$ with respect to the total amount of the silicon oxide precursor in terms of $SiO_2$ and the cerium in terms of $CeO_2$. For obtaining the composite oxide according to the present invention, the amount is usually 2 to 20 mass %, preferably 4 to 20 mass %, more preferably 5 to 20 mass %, most preferably 5 to 15 mass %. With too small an amount of silicon, the reducibility of the resulting composite oxide is low, whereas with too large an amount of silicon, the heat resistance of the resulting composite oxide is low and the specific surface area at higher temperatures is decreased.

In step (C), before adding the silicon oxide precursor, the salt concentration of the cerium suspension may be adjusted by removing the mother liquor from the cerium suspension or by adding water. The removal of the mother liquor may be effected, for example, by decantation, Nutsche method, centrifugation, or filter-pressing. In this case, a slight amount of cerium is removed with the mother liquor, so the amount of the silicon oxide precursor and water to be added next may be adjusted, taking this removed amount of cerium into consideration.

Step (C) may be carried out after the cerium suspension obtained through the heating and maintaining in step (B) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably a room temperature of 20 to 30° C.

The second method includes step (D) of heating and maintaining the cerium suspension containing the silicon oxide precursor up to and at not lower than 100° C., preferably 100 to 200° C., more preferably 100 to 150° C.

In step (D), the duration of the heating and maintaining may be usually 10 minutes to 6 hours, preferably 20 minutes to 5 hours, more preferably 30 minutes to 4 hours.

In step (D) of heating and maintaining, at lower than 100° C., the crystallinity of the precipitate to be discussed later is not sufficiently high, resulting in insufficient heat resistance and reducibility of the ultimate composite oxide. Too long a period of heating and maintaining affects little the heat resistance and the reducibility and is not industrially advantageous.

The second method includes step (E) of adding a precipitant to the cerium suspension containing the silicon oxide precursor obtained through the heating and maintaining to obtain a precipitate.

The precipitant used in step (E) may be a base, for example, sodium hydroxide, potassium hydroxide, aqueous ammonia, ammonia gas, or a mixture thereof, with the aqueous ammonia being particularly preferred. The amount of the precipitant to be added in step (E) may easily be determined by monitoring the pH change of the cerium suspension containing the silicon oxide precursor. Usually, the amount for generating a precipitate in the cerium suspension at pH 7 to 9, preferably pH 7 to 8.5, is sufficient.

Step (E) may be carried out after the cerium suspension obtained through the heating and maintaining in step (D) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably a room temperature of 20 to 30° C.

The precipitate may be separated by, for example, the Nutsche method, centrifugation, or filter-pressing. The precipitate may optionally be washed with water as needed.

The second method includes step (F) of calcining the precipitate thus obtained. The temperature for the calcining is usually 300 to 700° C., preferably 350 to 600° C.

Through step (F), a silicon-containing cerium composite oxide with excellent heat resistance and reducibility may be obtained.

The duration of the calcination may usually be 1 to 48 hours, preferably 1 to 24 hours, more preferably 3 to 20 hours.

According to the present invention, the composite oxide obtained from step (f) or (F) may be ground into a powder before use. The grinding may be carried out with a commonly used pulverizer, such as a hammer mill, to sufficiently obtain a powder of a desired powder size.

The particle size of the composite oxide powder obtained by the present method may be made as desired through the above-mentioned grinding, and may preferably be a mean particle diameter of 1 to 50 μm for use as a co-catalyst for a catalyst for exhaust gas purification.

The catalyst for exhaust gas purification according to the present invention is not particularly limited as long as the catalyst is provided with a co-catalyst containing the composite oxide of the present invention, and the method of production and other materials to be used may be, for example, conventional.

EXAMPLES

The present invention will now be explained in more detail with reference to Examples and Comparative Examples, which are not intended to limit the present invention.

Example 1

This example relates to a composite oxide having a cerium oxide to silicon oxide ratio of 98:2.

20 g of a ceric nitrate solution in terms of $CeO_2$ containing not less than 90 mol % tetravalent cerium ions was measured out, and adjusted to a total amount of 1 L with pure water. The obtained solution was placed in an autoclave reactor, heated to 120° C., maintained at this temperature for 6 hours, and allowed to cool down to the room temperature.

Then aqueous ammonia was added to the solution to neutralize to pH 8 to thereby obtain a slurry of cerium oxide hydrate. The slurry was subjected to Nutsche filtering for solid-liquid separation to obtain a filter cake, which was then calcined at 300° C. for 10 hours in a box-type electric furnace in an air atmosphere to obtain a cerium oxide.

15.8 g of the cerium oxide thus obtained was placed in a beaker, to which an ethanol solution of 1.04 g tetraethyl orthosilicate (0.31 g in terms of $SiO_2$) in a total amount of 10 mL was added to impregnate the cerium oxide with a solution of silicon oxide precursor by pore-filling.

Then the cerium oxide impregnated with the solution of silicon oxide precursor was dried at 120° C. for 10 hours, and calcined at 500° C. for 10 hours in the atmosphere to obtain a composite oxide powder mainly composed of cerium oxide with 2% by mass of silicon oxide.

The obtained composite oxide powder was measured of the specific surface areas by the BET method after calcination at 900° C. for 5 hours and at 1000° C. for 5 hours. Further, the cerium oxide reducibility was calculated from the measurement of temperature-programmed reduction (TPR) from 50° C. to 900° C. after calcination at 1000° C. for 5 hours. The results are shown in Table 1.

Example 2

This example relates to a composite oxide having a cerium oxide to silicon oxide ratio of 95:5.

A composite oxide powder mainly composed of cerium oxide with 5% by mass of silicon oxide was prepared in the same way as in Example 1 except that the amount of tetraethyl orthosilicate was 2.65 g (0.79 g in terms of $SiO_2$). The properties of the composite oxide powder thus obtained were evaluated in the same way as in Example 1. The results are shown in Table 1.

Example 3

This example relates to a composite oxide having a cerium oxide to silicon oxide ratio of 90:10.

A composite oxide powder mainly composed of cerium oxide with 10% by mass of silicon oxide was prepared in the same way as in Example 1 except that the amount of tetraethyl orthosilicate was 5.60 g (1.67 g in terms of $SiO_2$). The properties of the composite oxide powder thus obtained were evaluated in the same way as in Example 1. The results are shown in Table 1.

Example 4

This example relates to a composite oxide having a cerium oxide to silicon oxide ratio of 80:20.

A composite oxide powder mainly composed of cerium oxide with 20% by mass of silicon oxide was prepared in the same way as in Example 1 except that the amount of tetraethyl orthosilicate was 12.6 g (3.75 g in terms of $SiO_2$). The properties of the composite oxide powder thus obtained were evaluated in the same way as in Example 1. The results are shown in Table 1.

Example 5

This example relates to a composite oxide having a cerium oxide to silicon oxide ratio of 90:10 and prepared by a method different from Example 3.

20 g of a ceric nitrate solution in terms of $CeO_2$ containing not less than 90 mol % tetravalent cerium ions was measured out, and adjusted to a total amount of 1 L with pure water. The obtained solution was heated to 100° C., maintained at this temperature for 30 minutes, and allowed to cool down to the room temperature to thereby obtain a cerium suspension.

8.8 g of colloidal silica (2.2 g in terms of $SiO_2$) was added to the suspension thus obtained, maintained at 120° C. for 2 hours, allowed to cool, and neutralized to pH 8.5 with aqueous ammonia.

A slurry resulting from the neutralization was subjected to solid-liquid separation by Nutsche filtering to obtain a filter cake, which was calcined at 500° C. for 10 hours in the atmosphere to obtain a composite oxide powder mainly composed of cerium oxide with 10% by mass of silicon oxide.

The properties of the composite oxide powder thus obtained were evaluated in the same way as in Example 1. The results are shown in Table 1.

Comparative Example 1

This example relates to a cerium oxide without silicon oxide, which was obtained before the impregnation with the solution of a silicon oxide precursor in Example 1.

The properties of the obtained oxide powder were evaluated in the same way as in Example 1. The results are shown in Table 1.

TABLE 1

| | Composition (in terms of oxide) | Specific surface area ($m^2/g$) | | Reducibility (%) |
|---|---|---|---|---|
| | (mass %) | 900° C./5 h | 1000° C./5 h | 1000° C./5 h |
| Example 1 | Ce/Si = 98/2 | 65 | 45 | 30 |
| Example 2 | Ce/Si = 95/5 | 72 | 45 | 36 |
| Example 3 | Ce/Si = 90/10 | 88 | 56 | 53 |
| Example 4 | Ce/Si = 80/20 | 93 | 62 | 68 |
| Example 5 | Ce/Si = 90/10 | 91 | 51 | 59 |
| Comp. Ex. 1 | Ce = 100 | 47 | 25 | 20 |

Example 6

Composite oxide powders were prepared in the same way as in Example 1 except that the silicon oxide contents by mass of the resulting composite oxide powders were as shown in Table 2. The obtained composite oxide powders were measured of the specific surface areas by the BET method after calcination at 1000° C. for 5 hours in the same way as in Example 1. The results are shown in FIG. 1. Further, the reducibilities of the obtained composite oxide powders were calculated after calcination at 1000° C. for 5 hours in the same way as in Example 1. The results are shown in Table 2 and FIG. 2.

Comparative Example 2

Composite oxide powders were prepared in accordance with the method disclosed in Patent Publication 2 (JP-5-

270824-A) except that the silicon oxide contents by mass of the resulting composite oxide powders were as shown in Table 2. That is, 1 L of a ceric nitrate solution containing tetravalent cerium ions (1.24 mol/L) and having a free acidity of 0.332 N was placed in an autoclave reactor, and 2.555 L of an ammonia solution (0.3726 N) was added thereto at room temperature.

The addition of the ammonia solution to the ceric nitrate solution was carried out at room temperature at a rate of 1.664 L/hour. A colloidal aqueous dispersion of a tetravalent cerium compound at a 60 g/L concentration in terms of $CeO_2$ was obtained at a neutralization rate r=0.5.

The dispersion thus obtained was subjected to heat treatment at 100° C. for 4 hours in a reactor. A resulting precipitate was subjected to Nutsche filtering and 287 g of a yellow product was obtained. Water was added to 287 g of the yellow product to obtain 0.65 L of an aqueous suspension. 0.1 mL (11.4 N) of an ammonia solution, potassium methyl siliconate in an amount required for achieving the desired $SiO_2$ content of the resulting calcination product as shown in Table 2, and water were mixed to obtain 0.5 L of a mixed solution.

A suspension obtained by introducing this mixed solution to the aqueous suspension was placed in a 2 L autoclave, and maintained at 200° C. for 1 hour. At the end of this treatment, a resulting precipitate was separated by Nutsche filtering, and calcined at 350° C. for 3 hours in the atmosphere to obtain a composite oxide powder.

The composite oxide powder thus obtained was calcined at 1000° C. for 5 hours in the atmosphere, and the specific surface area and the reducibility were evaluated in the same way as in Example 6. The specific surface area thus measured is shown in FIG. 1 and the reducibility in Table 2 and FIG. 2.

TABLE 2

| Si content in terms of $SiO_2$ (mass %) | Reducibility (%) Example 6 | Reducibility (%) Comp. Ex. 2 |
| --- | --- | --- |
| 0.2 | 23 | — |
| 0.5 | 23 | 25 |
| 1 | 26 | 29 |
| 2 | 30 | 28 |
| 5 | 36 | 26 |
| 10 | 53 | 27 |
| 20 | 68 | — |

Figure 2:
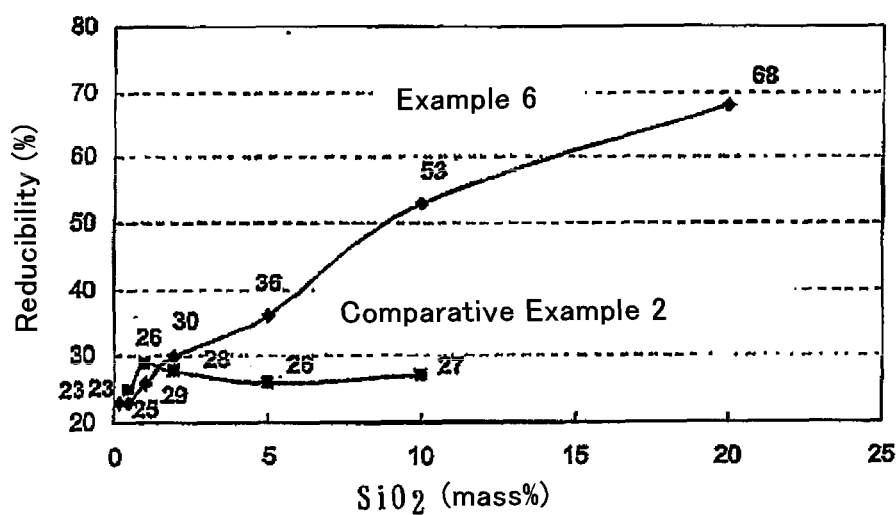
FIG. 2 is a graph showing the reducibilities of the silicon-containing cerium composite oxides prepared in Example 6 and Comparative Example 2 as calculated from measurement of TPR from 50° C. to 900° C. after calcination at 1000° C. for 5 hours.

As seen from FIG. 1, Table 2, and FIG. 2, the composite oxides obtained by the production method disclosed in Patent Publication 2 had the best specific surface area and reducibility with the silicon oxide content of 1 mass %, and at higher contents both the specific surface area and the reducibility were inferior. In contrast, in the Examples according to the production method of the present invention, even if the silicon oxide content is 1 mass % or higher, both the specific surface area and the reducibility were superior. This difference is presumed to be ascribable to the microstructure of the main component cerium oxide. The specific surface areas of the cerium oxides obtained through the same calcination without introducing the silicon oxide precursor according to Patent Publication 2 and the present invention, respectively, are comparable. However, the cerium oxide obtained by the method of the present invention is presumed to have larger total pore volume compared to the cerium oxide obtained by the method of Patent Publication 2. It is presumed that the size of the primary particles are similar between the two, but the primary particles of the present invention are less aggregated. Thus, with the composite oxide according to Patent Publica-tion 2, the pores of the cerium oxide were coated with a small amount (1 mass %) of silicon oxide, and addition of further silicon oxide disadvantageously fills up the pores to reduce the specific surface area. Further, in view of the research reports of A. Trovarelli et al. (e.g., Journal of Catalysis 194, 461-478 (2000)), cerium silicate is formed during the TPR measurement, and the resulting valence change of cerium element (from +4 to +3) is believed to be directly reflected in the reducibility. It is presumed that, with the composite oxide of Patent Publication 2, at a silicon oxide content of not less than 1 mass %, the added silicon oxide cannot be positioned near the cerium oxide, and the amount of cerium silicate generated during TPR measurement reaches the maximum at the silicon oxide content of 1 mass %, and so does the reducibility.

In contrast, according to the present invention, a larger amount of silicon oxide may be added until the pores of the cerium oxide are filled up, during which the specific surface area and the reducibility continue to increase, so that such a large specific surface area and a high reducibility are achieved at the same time, which are not achievable according to Patent Publication 2.

What is claimed is:

1. A silicon-containing cerium composite oxide comprising 2 to 20 mass % silicon in terms of $SiO_2$, and having properties of exhibiting a specific surface area of not less than 40 m$^2$/g as measured by BET method after calcination at 1000° C. for 5 hours, and a reducibility of not lower than 30% as calculated from measurement of temperature-programmed reduction from 50° C. to 900° C. after calcination at 1000° C. for 5 hours.

2. The silicon-containing cerium composite oxide according to claim 1 having a property of exhibiting a specific surface area of not less than 45 m$^2$/g as measured by BET method after calcination at 1000° C. for 5 hours.

3. The silicon-containing cerium composite oxide according to claim 1 having a property of exhibiting a specific surface area of not less than 60 m$^2$/g as measured by BET method after calcination at 900° C. for 5 hours.

4. The silicon-containing cerium composite oxide according to claim 1 having a property of exhibiting a reducibility of not lower than 35% as calculated from measurement of temperature-programmed reduction from 50° C. to 900° C. after calcination at 1000° C. for 5 hours.

5. The silicon-containing cerium composite oxide according to claim 1 comprising 5 to 20 mass % silicon in terms of $SiO_2$.

6. A method for producing a silicon-containing cerium composite oxide according to claim 1 comprising the steps of:
(a) providing a cerium solution not less than 90 mol % of which cerium ions are tetravalent,
(b) heating and maintaining said cerium solution obtained from step (a) up to and at not lower than 60° C.,
(c) adding a precipitant to a cerium suspension obtained through said heating and maintaining to obtain a precipitate,
(d) calcining said precipitate to obtain a cerium oxide,
(e) impregnating said cerium oxide thus obtained through calcination with a solution of a silicon oxide precursor, and
(f) calcining said cerium oxide thus impregnated with said solution of a silicon oxide precursor to obtain the silicon-containing cerium composite oxide.

7. A method for producing a silicon-containing cerium composite oxide according to claim 1 comprising the steps of:
(A) providing a cerium solution not less than 90 mol % of which cerium ions are tetravalent, (B) heating and maintaining said cerium solution obtained from step (A) up to and at not lower than 60° C.,
(C) adding a silicon oxide precursor to a cerium suspension obtained through said heating and maintaining,
(D) heating and maintaining said cerium suspension containing said silicon oxide precursor up to and at not lower than 100° C.,
(E) adding a precipitant to the cerium suspension containing the silicon oxide precursor obtained through said heating and maintaining to obtain a precipitate, and
(F) calcining the precipitate thus obtained to give the silicon-containing cerium composite oxide.

8. The method according to claim 6, wherein a cerium content of the cerium solution in step (a) is 5 to 100 g/L in terms of $CeO_2$.

9. A catalyst for exhaust gas purification comprising a silicon-containing cerium composite oxide according to claim 1.

10. The method according to claim 7, wherein a cerium content of the cerium solution in step (A) is 5 to 100 g/L in terms of $CeO_2$.

* * * * *